United States Patent [19]

Whetten

[11] Patent Number: 4,707,607

[45] Date of Patent: Nov. 17, 1987

[54] HIGH RESOLUTION X-RAY DETECTOR

[75] Inventor: Nathan R. Whetten, Ballston Lake, N.Y.

[73] Assignee: General Electric Company, Schenectady, N.Y.

[21] Appl. No.: 839,480

[22] Filed: Mar. 14, 1986

[51] Int. Cl.[4] .................... H01J 47/02; G01T 1/185

[52] U.S. Cl. .................................... 250/385; 250/374

[58] Field of Search .................. 250/385 R, 374, 375; 313/93, 538; 324/459; 378/19

[56] References Cited

U.S. PATENT DOCUMENTS

| | | | |
|---|---|---|---|
| 4,031,396 | 6/1977 | Whetten et al. | 250/385 |
| 4,306,155 | 12/1981 | Cotic | 313/93 |
| 4,376,893 | 3/1983 | Whetten | 250/385 |
| 4,394,578 | 7/1983 | Houston et al. | 250/385 |
| 4,481,420 | 11/1984 | Allemand et al. | 250/385 |
| 4,500,785 | 2/1985 | Whetten et al. | 250/385 |

*Primary Examiner*—Janice A. Howell
*Assistant Examiner*—Constantine Hannaher
*Attorney, Agent, or Firm*—Marvin Snyder; James C. Davis, Jr.

[57] ABSTRACT

A high resolution x-ray detector for medical computerized tomography systems is filled with a high pressure noble gas as a detecting medium. The detector comprises a housing having an x-ray permeable window and containing at least one electrically conductive voltage plate and at least one collector plate comprising a plurality of conductive elements. The gaseous detecting medium, such as xenon, occupies the space between the voltage and collector plates.

23 Claims, 10 Drawing Figures

HIGH RESOLUTION X-RAY DETECTOR

The present invention relates in general to apparatus for detecting x-rays, and more specifically to an x-ray detector comprising a very high pressure noble gas detecting medium for use in medical computerized tomography systems.

RELATED APPLICATIONS

This invention is related to the invention described and claimed in Whetten Application Ser. No. 839,481 filed concurrently herewith on Mar. 14, 1986 and assigned to the instant assignee.

BACKGROUND OF THE INVENTION

X-ray detectors for use in medical computerized tomography are well known in the art. Medical x-ray detectors, such as described and claimed in commonly assigned U.S. Pat. No. 4,031,396 to Whetten et al., are subject to the resolution-limiting effects of k-band x-ray fluorescence. This phenomenon relates to the emission of x-ray photons from the incident x-ray energy-excited gas molecules of the detecting medium and is fully explained in the above-cited patent. The atoms of a gaseous detecting medium, upon interacting with the incident x-ray energy, may themselves emit low energy x-ray photons. When the detecting medium allows a long absorption length for a fluorescent x-ray photon, the photon thus generated by secondary emission may be detected within the detector at a location remote from the point where the incident x-ray entered the detector. Such event degrades spatial resolution and decreases detector efficiency since a portion of the incident x-ray energy is thus not usefully detected. To address this problem, the Whetten et al. patent discloses a detector embodiment which employs voltage and collector plates comprising metals of high atomic number, such as tungsten. Such plates are substantially opaque to x-ray energy and effective to absorb the fluorescent x-rays, thereby minimizing their adverse effect on resolution.

The use of tungsten plates, however, causes a decrease in operating efficiency of an x-ray detector. The detector operating efficiency may be expressed as the percentage of incident x-ray energy that is sensed by the detector. It will be appreciated that absorption of fluorescent x-rays by tungsten plates aborts the liberation of charged particles in the detecting medium which can be detected at the collector plates. Hence, that portion of incident x-ray energy responsible for the emission of fluorescent x-rays goes undetected.

Another drawback to using tungsten plates is that they can absorb incident x-ray energy just as well as fluorescent x-rays. In the above-cited Whetten et al. patent, the tungsten plates are oriented parallel to the incident x-ray beam. While these plates are quite thin (0.05 mm), x-ray energy striking a plate edgewise will be absorbed. Therefore, in the aggregate, the sum of the thicknesses of the plurality of voltage and collector plates used in the Whetten et al. detector represents a significant incident x-ray absorption area and materially contributes to loss of detector efficiency.

Typical prior art medical x-ray detectors, such as disclosed in the Whetten et al. patent, employ a relatively low pressure gaseous detecting medium having a correspondingly low density. As a result, the absorption lengths of both the incident x-rays and fluorescent x-rays are relatively long. Such long absorption lengths necessitate the use of tungsten plates which extend a considerable distance into the gaseous detecting medium, e.g. approximatey one inch. The resulting large area presenting by each plate may cause a number of problems. First, microphonics are produced by any motion of the voltage plates with respect to adjacent collector plates. This motion may occur as a result of detector rotation in computerized axial tomography scanning, or even as a result of vibrations transmitted through the building structure supporting the equipment. Such voltage plate movements cause changes in the relative capacitances between the plates, which induce signals in the collector plates. The induced signals are superimposed on the true signals associated with the x-ray image and thus tend to distort spatial resolution. Moreover, the larger plate size must be accommodated, structurally, in order to maintain it rigid with respect to its adjacent collector plates.

Second, the large plates in the tungsten plate detector embodiment disclosed in the Whetten et al. patent are arranged in radial fashion aimed at the focal spot of the incident x-ray source. As a result, the position of the detector in relation to the x-ray source must be maintained precisely; otherwise, much of the incident beam will impinge on and be absorbed by the tungsten plates and hence not be detected.

Third, use of larger voltage plates can result in degradation of kilovolt peak (KVP) linearity. KVP linearity relates in general to a detector's sensitivity to different energy spectra of incident x-rays. The individual collector elements of an x-ray detector are usually calibrated in accordance with a particular x-ray energy spectrum. A patient undergoing examination with a medical computerized tomography x-ray detector may be exposed to an incident x-ray energy spectrum comprising a range of energies. Absorption of x-rays by the patient's body results in a shifting of the average energy of the spectrum toward a higher value. In order to maintain acceptable tomographic image resolution, it is necessary that the individual collector elements respond uniformly to this shifting of the average energy. To this end, it is necessary that the volume of the detecting medium allocated to each collector element be exactly the same. When the respective portions of the detecting medium volume associated with the individual collector elements become unequal, KVP linearity is degraded. Uniformly increasing these volume portions improves KVP linearity. However, in prior art medical detectors, the large tungsten plates require extra care in manufacture to maintain, with precision, equality between the adjacent volume portions respectively associated with the collector elements.

Industrial x-ray detectors known in the art are typically employed in such applications as inspection of jet engine turbine buckets, nuclear fuel rods, weldments, and other industrial inspection functions. Typically, these applications require higher resolution and higher energy x-rays than do medical applications. For example, industrial detectors may be used at an average x-ray energy of 300 to 400 KEV while the average x-ray energy in a medical detector application is only on the other of 50 to 125 KEV.

In order to achieve the higher resolution required in industrial applications, such industrial detectors have utilized structures in which the individual detector elements are extremely narrow and closely spaced, e.g. individual detector widths of only 2 to 3 mils and spacing of only 1 to 2 mils. Such detector element structure provides a degree of spatial resolution that is neither necessary nor desirable in medical computerized tomography. If such a high resolution detector structure were to be applied in a medical x-ray detector, the lower signal-to-noise ratio that would be experienced would require an intolerable increase in the x-ray dosage to the patient under study in order to achieve acceptable results.

Industrial x-ray detectors typically employ a high density gaseous detecting medium in order to minimize the absorption length of the higher energy x-rays being detected. For example, the detector disclosed in U.S. Pat. No. 4,394,578 to Houston et al. employs a detecting medium gas pressure of up to 200 atmospheres.

The extremely high (1) detecting medium gas pressures, (2) image resolution structures and (3) x-ray energies are important industrial x-ray detector design considerations which are not applicable to medical x-ray detectors.

OBJECTS OF THE INVENTION

It is a principal object of the present invention to provide a medical computerized tomography x-ray detector which exhibits improved performance over such devices of the prior art.

Another object of the present invention is to provide a medical computerized tomography x-ray detector in which the adverse effects of k-band x-ray fluorescence are minimized A further object of the present invention is to provide a medical computerized tomography x-ray detector capable of achieving high spatial resolution without the use of x-ray absorptive voltage and collector plates.

An additional object of the present invention is to provide a medical computerized tomography x-ray detector in which the adverse effects of large x-ray energy absorptive voltage and collector plate structures are minimized.

SUMMARY OF THE INVENTION

The foregoing objects of the present invention are achieved by means of a new and improved medical computerized tomography x-ray detector in which the adverse effects of k-band x-ray fluorescence are minimized by the use of a high pressure gaseous detecting medium. The detector comprises a housing with an x-ray permeable window and containing at least one electrically conductive voltage plate, at least one collector plate consisting of a plurality of conductive elements, and a detecting medium comprising a high pressure noble gas, such a xenon, occupying the space between the voltage and collector plates.

Upon establishing an electric field between the voltage and collector plates, x-ray energy entering the housing through the window interacts with the noble gas detecting medium to produce electrons and positive ions which propagate to the voltage plate and the most proximate of the collector plate elements where they are sensed to signal the incident of x-ray energy.

DESCRIPTION OF THE INVENTION

Figure 1:
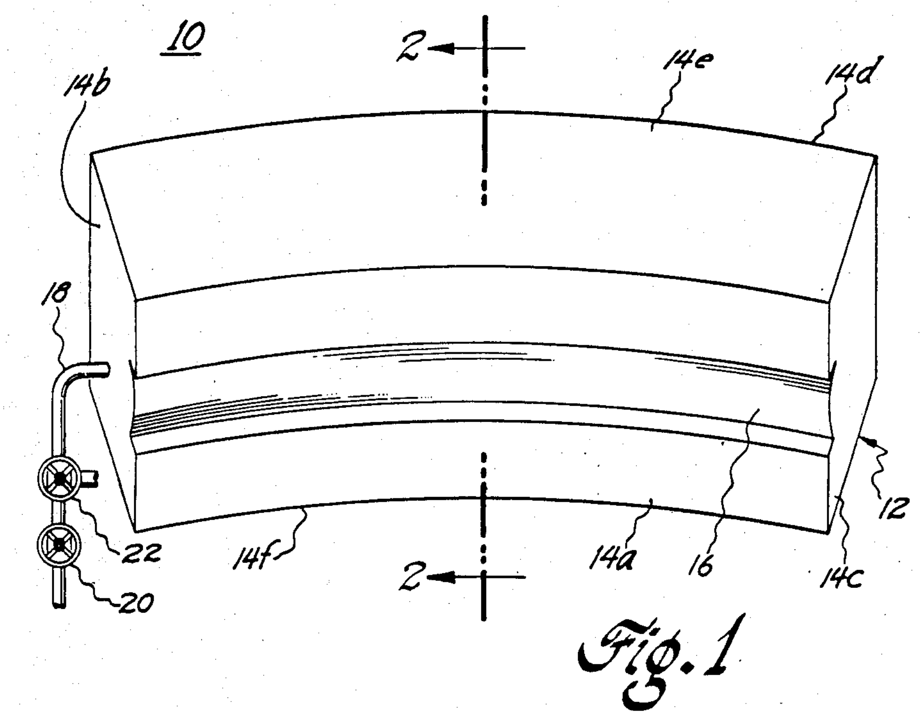
FIG. 1 is a perspective view of an x-ray detector constructed in accordance with the present invention.

Xenon has been shown to have a pressure-density relationship at room temperature which departs significantly from the ideal gas law. By increasing xenon pressure by a factor of 3, from 25 to 75 atmospheres, the density of the gas increases by a disproportionate factor of approximately 9.1. This behavior is documented in detail in the above-cited U.S. Pat. No. 4,394,578.

According to this invention, a medical computerized tomography x-ray detector utilizing a gaseous xenon detecting medium at a pressure that may be as low as 40 atmospheres or as high as 75 to 80 atmospheres, at 25° C., can be employed advantageously to improve performance of medical x-ray detectors, with especially significant benefits being realized above a pressure of 50 atmospheres. The fluorescent x-rays in the higher density xenon detecting medium have a characteristic absorption length as low as approximately 31 mils in 80 atmosphere xenon. This is an order of magnitude reduction by comparison with the absorption length, in prior art medical detectors, of approximately 320 mils in 25 atmosphere xenon. The 31 mil absorption length achieved by the present invention is less than the spacing between adjacent collector detecting elements. As a result, fluorescent x-rays will be detected in very close proximity to the detector entry location of the incident x-ray responsible for the generation thereof. Hence, absorptive voltage and collector plates such as the tungsten plates of the above-cited medical detector may be eliminated. Consequently, x-ray detectors built in accordance with certain embodiments of the present invention are not only free of resolution impairment directly attributable to fluorescent x-rays but are also free of limitations attributable to use of the tungsten plates, as follows. First, there is no loss in efficiency due to nondetected absorption of fluorescent x-rays. Second, there is no loss of efficiency due to absorption of incident x-rays directly by the tungsten plates. Third, plate size may be reduced, with consequent reduction or elimination of microphonics. Fourth, with the reduction in plate size or elimination of the tungsten plates, the directionality constraints relating to alignment of the detector with respect to the x-ray source are greatly eased. Lastly, KVP linearity is improved by the increase in xenon density, which is known to be equivalent to uniformly increasing the detecting medium volume portions respectively associated with the collector detecting elements. Further, by reduction in size or complete elimination of the tungsten plates, the uniformity of adjacent volume portions may be maintained more accurately.

In one embodiment of this inventio, tungsten plates are employed. However, due to the short absorption length of both incident and fluorescent x-rays in the high pressure gaseous xenon detecting medium, the extension of the tungsten plates into the xenon may be limited to a very short distance, thereby avoiding the aforementioned limitations that can result from use of large area tungsten plates.

Figure 2:
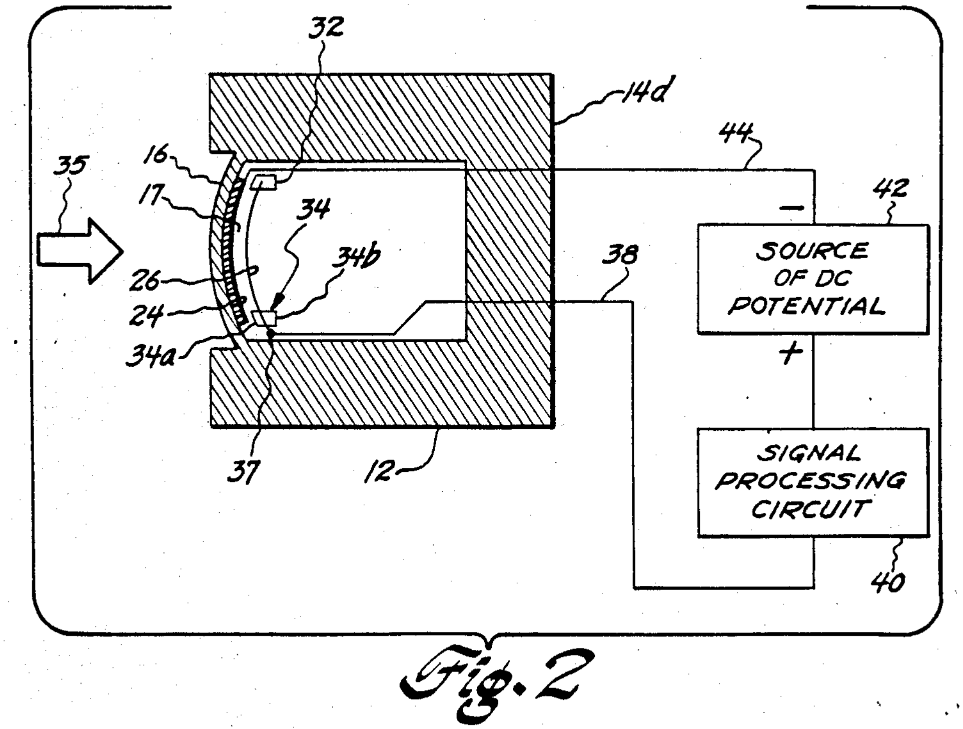
FIG. 2 is a vertical sectional view taken along line 2—2 in FIG. 1 illustrating one embodiment of the present invention and schematically illustrating its connections to operational electronic circuitry.

A medical x-ray detector 10 built according to the instant invention is shown in FIG. 1 to include a housing 12 having a front wall 14*a*, side walls 14*b* and 14*c*, a back wall 14*d*, a top wall 14*e* and a bottom wall 14*f*. These wall designations are used for the particular detector orientation shown. However, it will be understood that detector 12 is operable in any spatial orientation. In the preferred embodiment of the invention, housing 12 is constructed of a low atomic weight, x-ray permeable material such as aluminum. Located in front wall 14*a* is an x-ray permeable window 16 which may be constructed of aluminum of a uniform thickness of approximately one-eighth inch. Referring also to FIG. 2, window 16 is seen to have a concavo-convex curvature in cross section. The overall housing, as viewed from the top, has the shape of an annulus section.

Housing 12 has the structural capability to contain a gaseous x-ray detecting medium at a pressure of up to approximately 80 atmospheres. To withstand this pressure, the housing wall thickness need be only approximately ½ inch and the use of special structural reinforcing members is unnecessary. The gaseous detecting medium is introduced into the housing via a pipeline 18 penetrating housing side wall 14b, and including a main valve 20 and a housing pressure relief valve 22.

Figure 3:
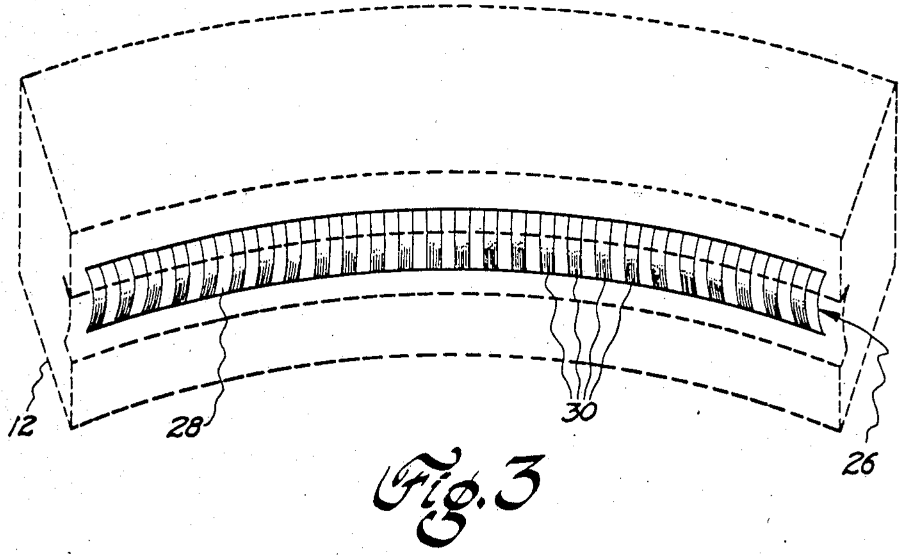
FIG. 3 is a perspective view of a collector plate utilized in the detector of FIG. 2.

FIG. 2 illustrates the particular voltage and collector plate configuration utilized in this embodiment of the present invention. An x-ray transparent voltage plate 24 is mounted on the inside surface of window 16 and a collector plate 26 is mounted parallel to, and inwardly spaced from, this voltage plate. With the plates so mounted, an incident x-ray beam 35 entering housing 12 through window 16 passes through the voltage plate to interact with gaseous xenon detecting medium 17 disposed between the voltage and collector plates. Voltage plate 24 may comprise a sheet of aluminized Mylar® plastic film with the Mylar plastic film side contacting the window to electrically insulate the aluminized side from window 16. Collector plate 26 is spaced, for example, approximately 100 mils behind voltage plate 24. Collector plate 26, as best shown in FIG. 3, comprises a rigid sheet 28 of nonconductive material such as fiberglass and epoxy on which are disposed conductive collector elements as parallel, equally-spaced stripes 30 of a substantially uniform width selected in the range of 30 to 50 mils, for example. A spacing of approximately 2 to 3 mils, for example, is provided between stripes. Conductive stripes 30 comprise coatings of material such as aluminum or copper, for example, and are disposed on the side of sheet 28 facing voltage plate 24. Collector plate 26, in addition to having an arcuate contour conforming to the annular shape of housing 12, has a concavoconvex curvature in cross section substantially the same as that of window 16.

Collector plate 26 is mounted along its two long edges in a pair of support blocks 32 and 34 (FIG. 2), which are preferably of a good electrical insulating material such as a machinable ceramic. Support block 34 includes block portions 34*a* and 34*b* which may be fastened to plate 26 by an epoxy cement so that the lower edge of the plate is accessible beneath this support block. An edge connector 37, which may be of the type used for making electrical connections to the edge of the circuit board, is applied to the lower edge of plate 26 in order to make separate electrical connections to stripes 30. These connections are brought out through back wall 14*d* of housing 12 by a cable 38 connected to a signal processing circuit 40. Means such as solder (not shown) connects voltage plate 24 to a lead 44 running to a source of DC potential 42. Source 42 is also connected via circuit 40 to stripes 30 in order that an electric field may be established between the voltage plate and the collector plate stripes.

Figure 4:
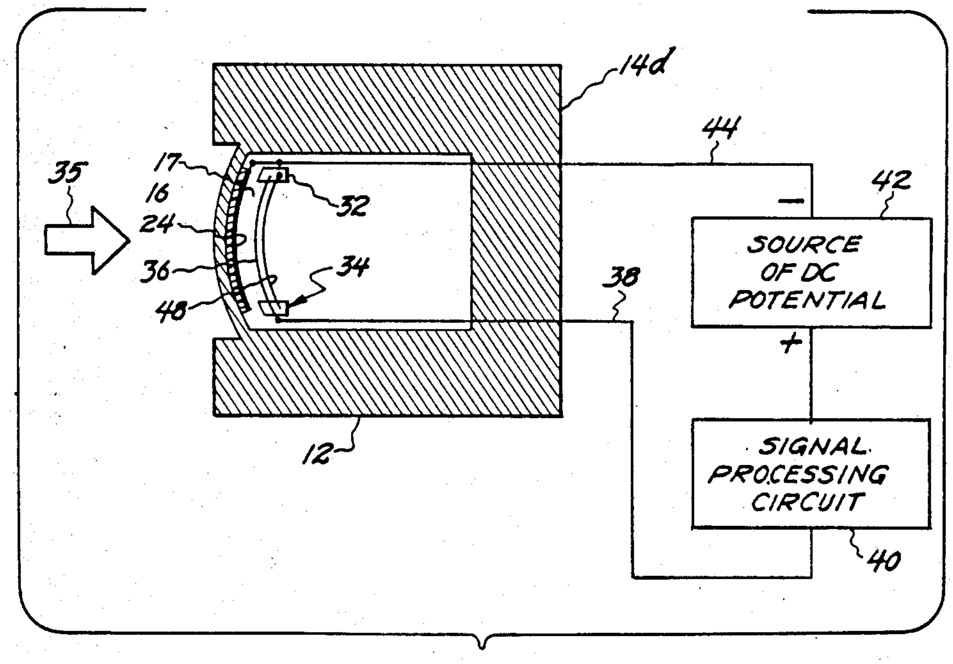
FIG. 4 is a vertical sectional view of a detector constructed in accordance with an alternative embodiment of the present invention, schematically illustrating its connections to operational electronic circuitry.

Referring to FIG. 4, the embodiment shown in FIG. 2 may be modified by addition of a second voltage plate 48 mounted approximately 100 mils behind voltage plate 24. An x-ray transparent collector plate 36 is mounted approximately midway between voltage plates 24 and 48. Gaseous medium 17 disposed within housing 12 substantially fills the spaces between the plates. Plate 48 is mounted along its long edges in grooves in support blocks 32 and 34. Voltage plate 48 comprises a rigid sheet of conductive material such as aluminum or copper. Plate 48, accessed via a hole in support block 32, is connected electrically in parallel with plate 24 to source 42 by lead 44.

Collector plate 36 is substantially x-ray transparent and comprises a rigid sheet of nonconductive material, such as previously discussed, on both sides of which are disposed conductive stripes. The stripes have substantially the same width and spacing as previously discussed and comprise a substantially x-ray transparent coating of conductive material such as aluminum. Plate 36 is mounted in blocks 32 and 34 with connections to the conductive stripes again being accomplished by an edge connector attached to the collector plate's exposed lower edge. Plates 36 and 48, in addition to having an arcuate contour conforming to housing 12, each have a concavo-convex curvature in cross section substantially the same as that of window 16.

Figure 5:
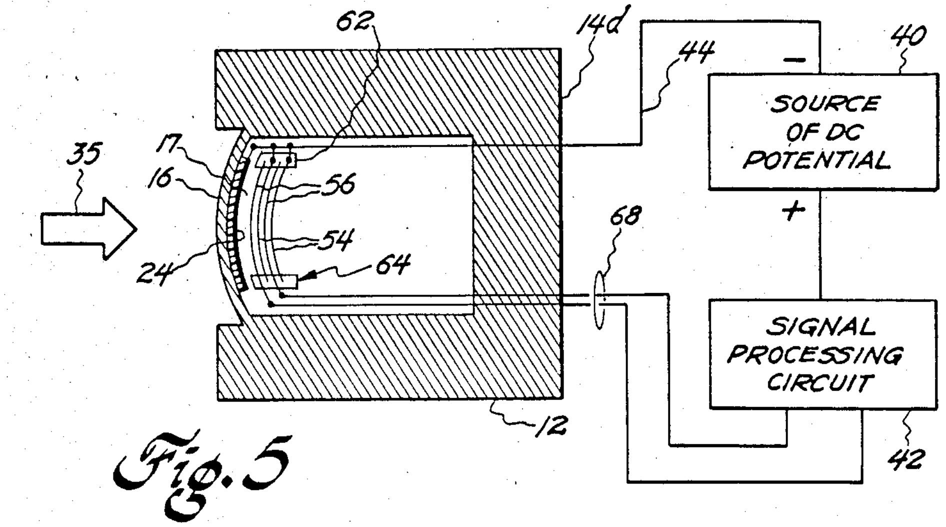
FIG. 5 is a vertical sectional view of a detector constructed in accordance with yet another embodiment of the present invention, schematically illustrating its connections to operational electronic circuitry.

Referring to FIG. 5, the detector embodiment shown in FIG. 2 may be further modified by positioning within housing 12 an alternating sequence of additional x-ray transparent voltage and collector plates behind voltage plate 24. For example, two additional voltage plates 54 and two collector plates 56 can be mounted in alternating relationship with one another in the gaseous detecting medium environment. The plates are equidistantly spaced, each having an arcuate contour conforming to housing 12 as well as a concavo-convex curvature in cross section substantially the same as that of window 16.

Figure 6:
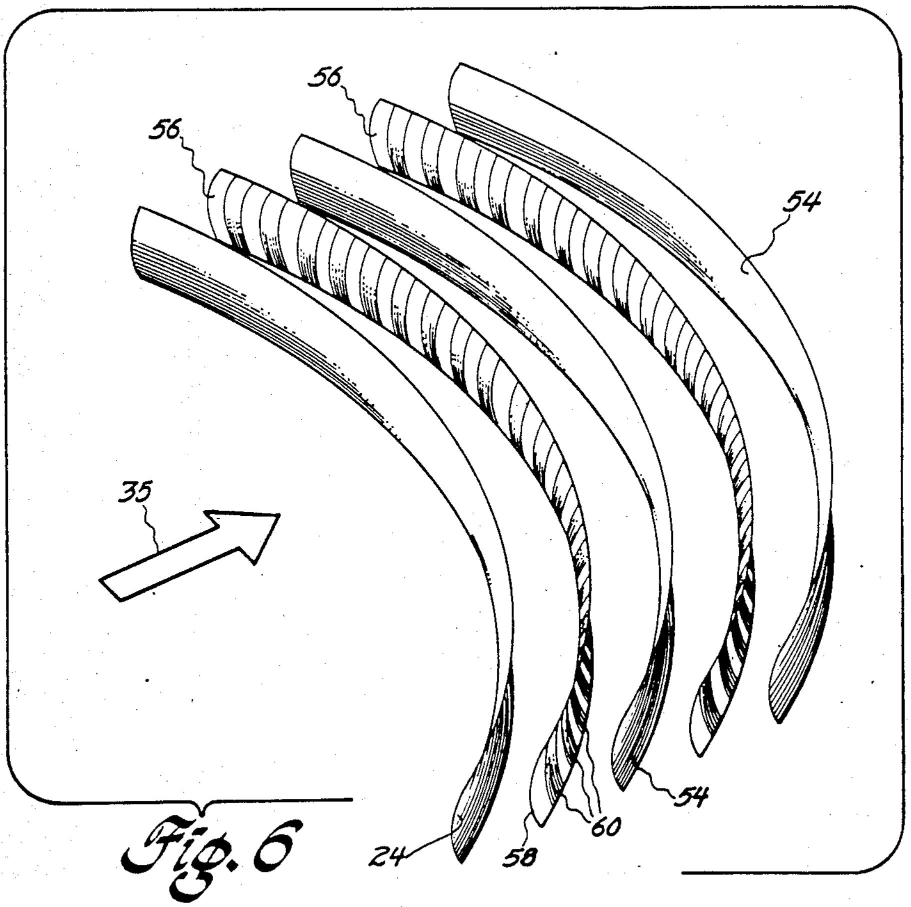
FIG. 6 is a perspective view of the voltage and collector plates utilized in the detector embodiment shown in FIG. 5.

FIG. 6 illustrates the relative positions of the plates within the housing shown in FIG. 5. Each voltage plate 54 comprises a rigid sheet of conductive material which is x-ray transparent, such as aluminum 46. Each collector plate 56 similarly comprises a rigid sheet of nonconductive material 58 on both sides of which are disposed conductive stripes 60 comprising coatings of x-ray transparent material, such as aluminum.

As shown in FIG. 5, voltage plates 54 are respectively mounted along their long edges in a pair of support blocks 62 and 64 grooved to receive the plates. Blocks 62 and 64 consist substantially of a material having good electrical insulating characteristics such as a machinable ceramic. Voltage plates 54, accessed via holes in support block 62 are connected electrically in parallel with one another and with plate 24 to DC source 42 by lead 44.

Electrical connections to stripes 60 on collector plates 56 are made in a manner analogous to that described with respect to the detector embodiment of FIG. 2. That is, edge connectors, not shown, of the type previously described are applied to the projecting lower edges of plates 56 in order to make electrical connections to their stripes 60. Connections between these edge connectors and signal processing circuit 40 may be accomplished by cables 68 passing through back wall 14*d* of housing 12.

Figure 7:
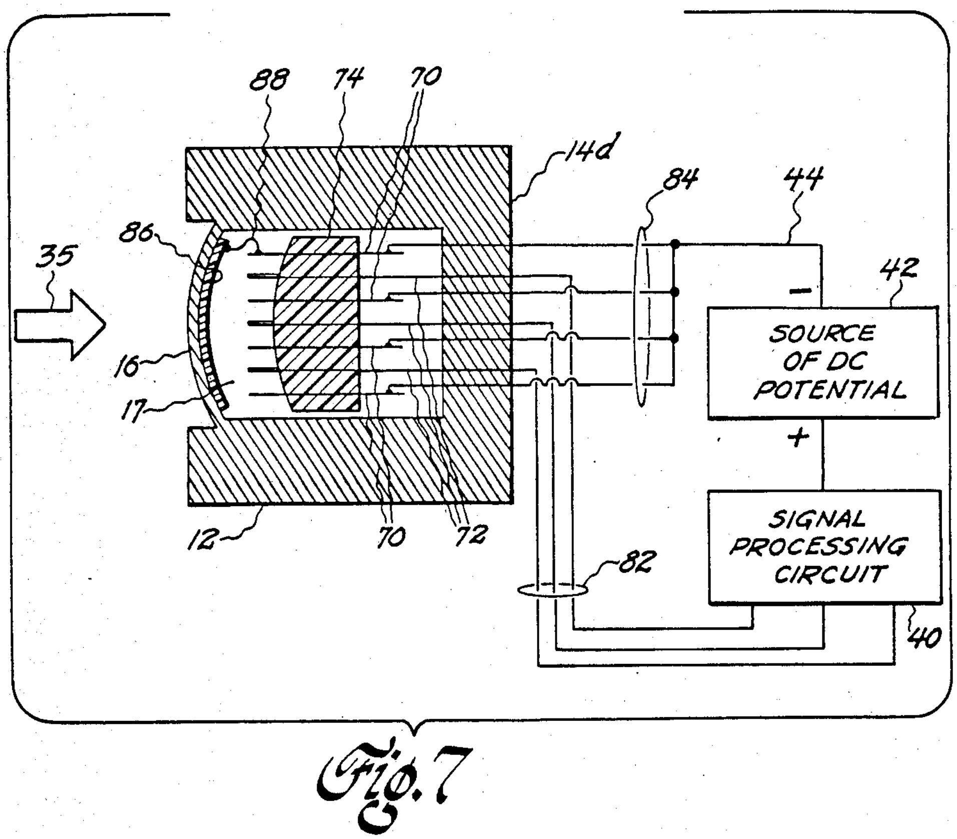
FIG. 7 is a vertical sectional view of still another detector embodiment of the present invention, schematically illustrating its connections to operational electronic circuitry.

FIG. 7 illustrates a different detector plate configuration embodiment of the present invention in which a plurality of voltage plates 70 and a plurality of collector plates 72 are positioned behind window 16 in substantially parallel relationship to one another and to x-ray beam 35. Gaseous medium 17 fills the spaces between adjacent plates, as well as the space between the window and the plates. Plates 70 and 72 are mounted in a ceramic support block 74 extending substantially coextensively with the arcuate length of the housing to maintain an equally spaced, alternating relationship between the plates. In the preferred form of this detector embodiment, thirteen voltage plates and twelve collector plates uniformly spaced 40 mils apart are utilized. For convenience of illustration, only four voltage plates 70 and three collector plates 72 are shown in FIG. 7.

Figure 8:
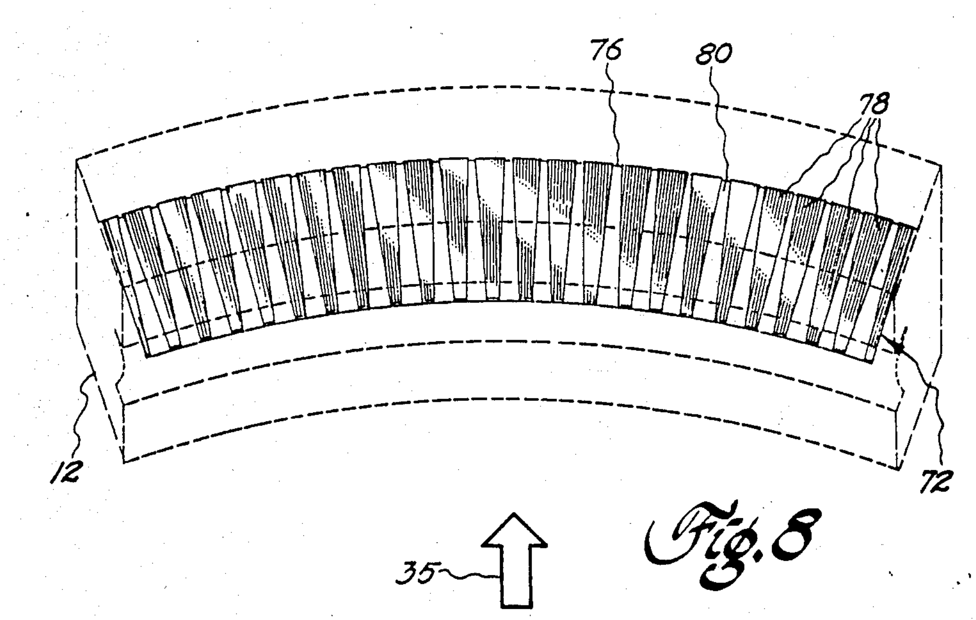
FIG. 8 is a perspective view of a collector plate utilized in the detector of FIG. 7.

As best seen in FIG. 8, each collector plate 72 in the embodiment shown in FIG. 7 comprises a rigid sheet of nonconductive material 76 such as fiberglass and epoxy on which are disposed collector plate elements in the form of conductive stripes 78. Stripes 78 are disposed on both sides of sheet 76 and are positioned radially with respect to x-ray beam 35. Stripes 78 are equidistantly spaced apart from each other and are substantially identical, each tapering slightly in the direction toward window 16 due to the arcuate curvature of plate 72. The stripes may each comprise a coating of conductive material such as aluminum or copper, of an average width selected in the range of 30 to 50 mils. The spacing between individual stripes is approximately 2 to 3 mils. Voltage plates 70 (FIG. 7) are arranged with the same arcuate curvature as that shown for collector plates 72 (FIG. 8). Each plate 70 comprises a rigid sheet of conductive material, such as aluminum or copper. In the preferred form of this detector embodiment, as shown in FIG. 7, plates 70 and 72 project outwardly (toward window 16) beyond support block 74 by approximately 100 mils.

As shown in FIG. 7, a rear portion 80 of each collector plate 72, respectively, extends through back wall 14*d* of housing 12 in order to provide access to stripes 78 (FIG. 8) for electrical connection. Housing 12 is sealed around each rear portion 80 of collector plates 72 by an epoxy seal (not shown). An edge connector (not shown) of the type previously described is applied to rear portion 80 of each collector plate 72, respectively, so as to make individual electrical connection with stripes 78. Leads 82 interconnect the edge connectors with signal processing circuit 40. Individual cable connections 84 are made to voltage plates 70, respectively, via sealed cable feedthroughs in back wall 14*d*. Connections 84 are passed out of housing 12 and commonly connected to source 42 by lead 44. Source 42 is also connected to stripes 78 by interconnection to circuit 40 in order that an electric field may be established between the stripes and the voltage plates.

Detector 10 preferably includes a window plate 86 comprising a sheet of conductive material mounted on the inside surface of window 16. Plate 86 comprises an x-ray transparent sheet of aluminized Mylar plastic film with the Mylar plastic film side in contact with the surface of window 16 in order to insulate therefrom the aluminized conductive side of plate 86. The aluminized side of plate 86 is electrically connected to one of the voltage plates 70 by a jumper connection 88 in order that the aluminized side may be maintained at the same voltage potential as that of plates 70.

Figure 9:
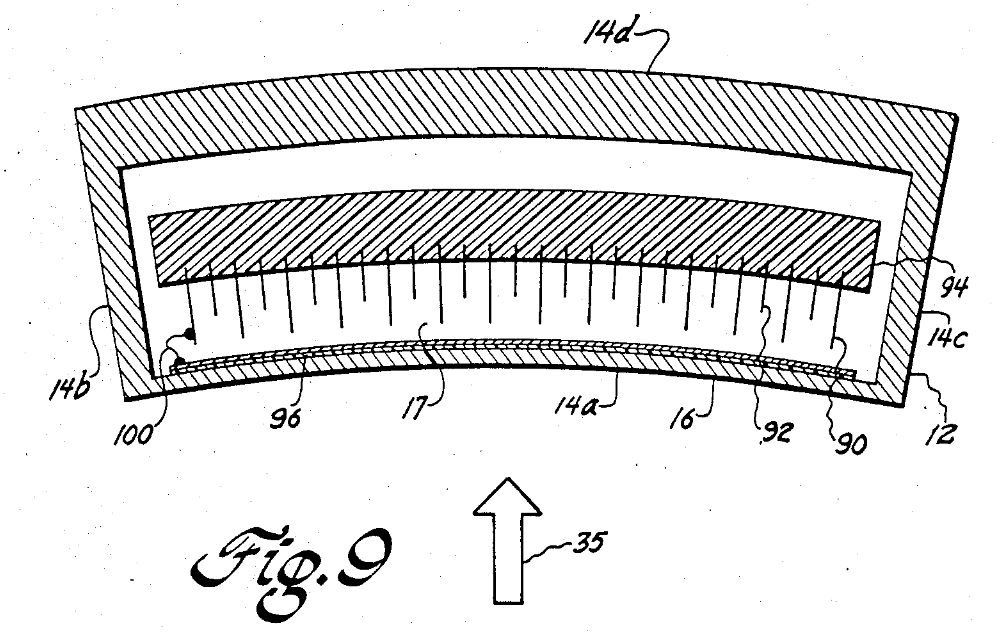
FIG. 9 is a cutaway top view of a detector constructed in accordance with yet a further embodiment of the present invention.
Figure 10:
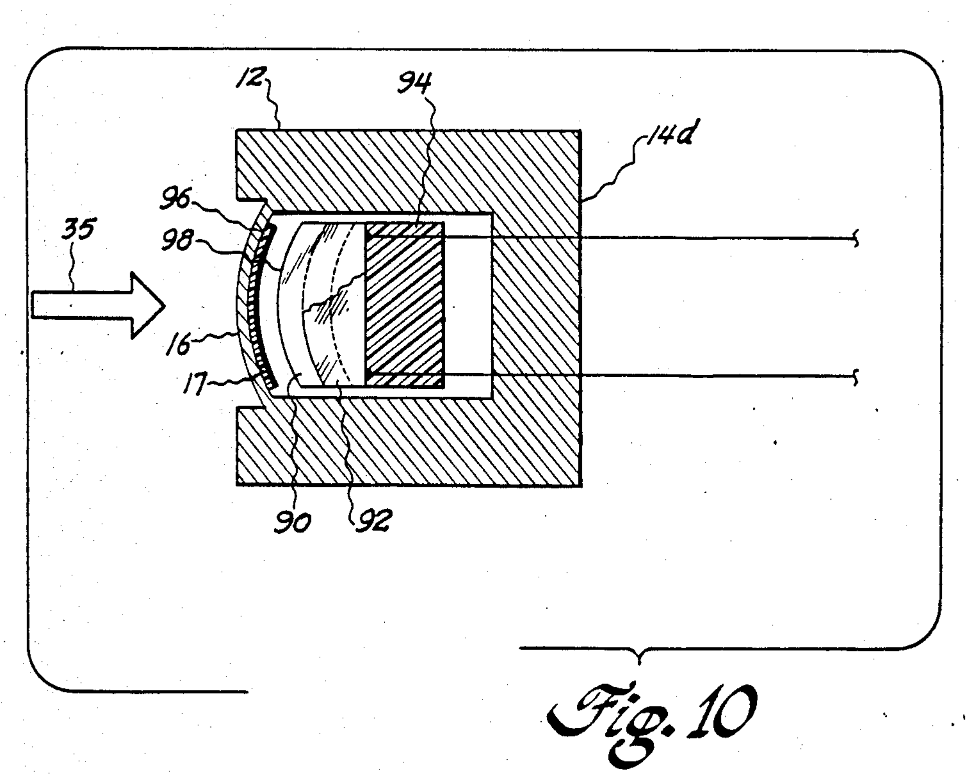
FIG. 10 is a vertical sectional view of the detector of FIG. 9.

FIG. 9 illustrates yet another detector plate configuration in which a plurality of voltage plates 90 are positioned in uniformly spaced, alternating relationship with a plurality of collector plates 92. Plates 90 and 92, each comprising a metal of high atomic number substantially opaque to x-ray energy, such as tungsten, are arrayed radially, with plates 90 spaced at a first uniform distance from the arcuate contour, from side to side, of window 96 and with plates 92 spaced at a second uniform distance from the arcuate contour, from side to side, of window 16. Gaseous medium 17 fills the space between adjacent plates as well as between the window and the plates. The plates are mounted in a support block 94 comprising a material having good electrical insulating characteristics, such as a machinable ceramic. In a preferred form of this embodiment, the collector plates extend forward approximately 100 mils beyond block 94 and the voltage plates extend approximately 10 mils further beyond the collector plates. As in previous embodiments, a window plate 96 in the form of an aluminized Mylar Plastic film is insulatively applied to the inside surface of window 16. As shown in FIG. 10, the front edge 98 of each voltage plate 90 has a contour substantially corresponding to the curvature of a window plate 96 disposed on the inside surface of window 16. Each of collector plates 92 likewise has its front edge so contoured.

The above-described plate extensions are shorter in length by comparison to the extensions of the medical x-ray detector described and claimed in the above-cited U.S. Pat. No. 4,031,396. By virtue of the limited plate exposure to the gaseous xenon detecting medium, the present invention does not suffer from most of the previously described limitations of tungsten plates as utilized in prior art medical detectors.

In a preferred form of this embodiment, the voltage plates are connected electrically in parallel with one another within the housing by connections (not shown). A single connection to the parallel-connected voltage plates is brought out through back wall 14*d* of housing 12 for making connection to the DC source. Each collector plate is separately connected to the signal processing circuit by a cable connection (not shown) passing through back wall 14*d*. An electrical jumper connection 100 (FIG. 9) is provided between window plate 96 and one of the voltage plates 90 in order that plate 96 be maintained at the same potential as the voltage plates.

To operate the disclosed embodiments of the invention, the detector housing is first filled with gaseous xenon through pipeline 18 with main valve 20 in the open position (FIG. 1). Upon filling housing 12 to a pressure of at least 40 atmospheres but preferably over 50 atmospheres and up to 75 to 80 atmospheres, main valve 20 is closed. Relief valve 22 is selected to have an operating characteristic effective to relieve the pressure within housing 12 should the gaseous pressure exceed the 75 to 80 atmosphere operating pressure that housing 12 is designed to withstand. Connections, as previously described, are made between the collector stripes or plates and the signal processing circuit as well as between the voltage plates and the DC source. As a result, as electric field is established between the voltage plates and window plate at one polarity and the collector stripes or plates at the opposite polarity. An x-ray beam 35, having an average energy in the range of 50 to 125 KEV typical of medical x-ray detector applications, enters housing 12 through window 16, and passes through the x-ray permeable window plate into the gaseous xenon detecting medium. The x-ray energy interacts with the gaseous xenon to ionize the gas molecules into electrons and positive ions. Under influence of the electric field, the electrons and positive ions propagate between the most proximate voltage plates and collector plates. For the polarity shown in FIG. 2, electrons will propagate to the collector plates (plate 26 in FIG. 2) while positive ions will propagate to the voltage plates (plate 24 in FIG. 2).

Energizing the window plate to the same potential as the voltage plates serves to establish an electric field in the detecting medium in the region proximate the window. As a result, x-ray energy that interacts with the detecting medium in this region will initiate the above-described electron/ion propagation, thereby enhancing detector efficiency. The currents at the various collectors are processed in a well known manner by the signal processing circuit pursuant to forming a computerized tomography image.

The embodiments illustrated in FIGS. 7 and 9 include a window plate 86 and 96, respectively, in order to enhance the efficiency of the detector. However, a detector built in accordance with either of these embodiments, but with the window plate eliminated, would also function adequately. In the latter case, only that portion of x-ray energy interacting with the gaseous xenon detecting medium immediately behind the housing window runs the possibility of not being sensed, or sensed with erroneous spatial resolution.

The separate connections of collector stripes to the signal processing circuit is preferred herein. However, with respect to the embodiment illustrated in FIG. 5 for example, each pair of transversely-opposed stripes on opposite sides of each collector plate may be connected electrically in parallel and also in common with the pairs of stripes on the other collector plates aligned therewith along the trajectory of the incident x-ray beam. Thus, connections of groups of stripes rather than individual stripes could be made to the signal processing circuit.

As a further alternative, with respect to the embodiment illustrated in FIGS. 7 and 8, each pair of transversely-opposed stripes 78 on each collector plate 72 is aligned, respectively, with pairs of stripes on the other collector plates into groups of collector stripes, each such group lying in a plane perpendicular to the collector plates. The stripes in each such group may be electrically connected in parallel with one another and to the signal processing circuit 40. Thus, with respect to this embodiment also, connections of groups of stripes rather than individual stripes could be made to the signal processing circuit.

While the embodiment illustrated in FIG. 7 includes a rear portion of each collector plate 72 extended through the housing back wall, this construction may be dispensed with. In the alternative, the rear portion of each collector plate may terminate with the housing. Then, an edge connector may be applied to the rear portion of each collector plate within the housing and the edge connectors coupled to the signal processing circuit by leads passing through the housing back wall.

While only certain preferred features of the invention have been illustrated and described herein, many modifications and changes, in whole or in part, will occur to those skilled in the art. It is, therefore, to be understood that the appended claims are intended to cover all such modifications and changes as fall within the true spirit and scope of the invention.

What is claimed is:

1. A high resolution, computerized tomography x-ray detector, comprising:

a housing;

an x-ray permeable window disposed in a front wall of said housing;

a first voltage plate in the form of a sheet of electrically conductive material disposed proximate the surface of said window facing into said housing, said first voltage plate being substantially transparent to x-ray energy;

a collector plate including an array of discrete, electrically conductive collector plate elements, said collector plate comprising a sheet of nonconductive material on which said conductive collector plate elements are disposed as substantially parallel collector stripes, each of each collector stripes including means for making separate electrical connection to a signal processing circuit;

said first voltage plate and said collector plate mounted in substantially parallel, opposed relation within said housing in locations behind said window;

a second voltage plate;

said collector plate being substantially transparent to x-ray energy and disposed between, and equidistantly spaced from, said first and second voltage plates;

said collector stripes being disposed on the opposite surfaces of said nonconductive sheet in facing relation with said first and second voltage plates; and a noble gas contained within said housing and having a pressure in the range of 40 to 80 atmospheres, said pressure thereby being sufficiently high as to limit the characteristic absorption length of x-rays therein;

such that x-ray energy entering said housing through said window in the presence of an electric field between said voltage plate and said collector plate elements interacts with said gas to produce electrons and positive ions which propagate between said voltage plate and the most proximate of said collector plate elements.

2. The x-ray detector claim 1 wherein said voltage plate disposed proximate to the surface of said window constitutes a first voltage plate, and wherein said detector further includes:

a plurality of second voltage plates disposed in spaced relation to said window; and a plurality of collector plates positioned with respect to said first and second voltage plates to achieve an alternating sequence of respectively spaced voltage plates and collector plates;

said collector stripes of each said collector plate being disposed on the opposite surfaces of said nonconductive sheet thereof in facing relation with the adjacent ones of said voltage plates; and said second voltage plates and said collector plates being substantially transparent to x-ray energy.

3. The x-ray detector of claim 2 wherein said window is concavo-convex in cross section, said second voltage plates and said collector plates being uniformly spaced from said window and being correspondingly of concavo-convex cross section.

4. The x-ray detector of claim 2 wherein each of said collector stripes is between 30 and 50 mils in width.

5. A high resolution, computerized tomography x-ray detector, comprising:

a housing;

an x-ray permeable window disposed in a front wall of said housing, said window being concavo-convex in cross section;

a window sheet disposed proximate the inner surface of said window, said window sheet being mounted in electrically insulative relation to said inner surface of said window and being substantially transparent to x-ray energy;

a plurality of voltage plates, each being in the form of a sheet of electrically conductive material; and a plurality of collector plates positioned with respect to said voltage plates to achieve an alternating sequence of respectively spaced voltage and collector plates, each of said collector plates including an array, respectively, of discrete, electrically conductive collector plate elements;

said voltage and collector plates being mounted such that an x-ray energy beam penetrating said window passes substantially parallel to and between said plates;

each of said collector plates comprising a sheet of nonconductive material, respectively, said conductive collector plate elements being disposed as spaced, substantially parallel collector stripes on the opposite surfaces of said nonconductive sheet in facing relation, respectively, with the adjacent ones of said voltage plates; and gaseous xenon disposed within said housing and having a pressure in the range of 40 to 80 atmospheres, said pressure being sufficiently high as to limit the characteristic absorption length of x-rays therein such that x-ray energy entering said housing through said window in the presence of an electric field established between said window sheet and said collector stripes interacts with the portion of said gaseous xenon proximate said window to produce electrons and positive ions which propagate between said window sheet and the most proximate of said collector stripes.

6. The x-ray detector of claim 5 wherein each of said collector stripes is between 30 and 50 mils in width.

7. A high resolution, computerized tomography x-ray detector, comprising:

a housing;

an x-ray permeable window disposed in a front wall of said housing;

a plurality of voltage plates, each of said voltage plates being in the form of a sheet of electrically conductive material, respectively;

a collector plates including an array of discrete, electrically conductive collector plate elements;

a support block;

said voltage plates and said collector plate elements being mounted in said support block and positioned in alternating relationship such that an x-ray energy beam penetrating said window passes between said voltage plates and said collector plate elements, said collector plate elements extending beyond said support block approximately 100 mils into said gaseous xenon along a direction parallel to said x-ray beam;

said voltage plates and said collector plate elements comprising materials that are substantially opaque to x-ray energy; and gaseous xenon disposed within said housing and having a pressure in the range of 40 and 80 atmospheres, said pressure being sufficiently high as to limit the characteristic absorption length of x-rays therein.

8. A high resolution, computerized tomography x-ray detector, comprising:

a housing;

an x-ray permeable window of concavo-convex cross section disposed in a front wall of said housing;

a window sheet disposed proximate the inner surface of said window, said window sheet being mounted in electrically insulative relation to said inner surface of said window and being substantially transparent to x-ray energy;

a plurality of voltage plates, each of said voltage plates being in the form of a sheet of electrically conductive material, respectively;

a collector plate including an array of discrete, electrically conductive collector plate elements;

said voltage plates and said collector plate elements being positioned in alternating relationship such that an x-ray energy beam penetrating said window passes between said voltage plates and said collector plate elements;

said voltage plates and said collector plate elements comprising materials that are substantially opaque to x-ray energy; and gaseous xenon disposed within said housing and having a pressure in the range of 40 to 80 atmospheres, said pressure being sufficiently high as to limit the characteristic absorption length of x-rays therein;

such that x-ray energy entering said housing through said window in the presence of an electric field established between said window sheet and said collector plate elements interacts with the portion of said gaseous xenon proximate said window to produce electrons and positive ions which propagate between said window sheet and the most proximate of said collector plate elements.

9. A high resolution computerized tomography x-ray detector, comprising:

a housing;

an x-ray permeable window disposed in a front wall of said housing;

a first voltage plate disposed proximate the inner surface of said window;

a second voltage plate mounted within said housing in substantially parallel, spaced relation to said first voltage plate;

said first and second voltage plates each comprising a sheet of electrically conductive material, respectively;

a collector plate position parallel to and intermediate said first and second voltage plates;

said collector plate comprising a sheet of nonconductive material and a plurality of substantially parallel conductive collector stripes disposed on the opposite surfaces of said nonconductive sheet, respectively, in facing relation with said first and second voltage plates, respectively;

each of said collector stripes, respectively, including means for making separate electrical connection to a signal processing circuit;

said first voltage plate and said collector plate being substantially transparent to x-ray energy;

a plurality of additional second voltage plates;

a plurality of additional collector plates positioned with respect to said additional second voltage plates to achieve an alternating sequence of respectively spaced voltage plates and collector plates, each of said second voltage plates being substantially transparent to x-ray energy; and gaseous xenon disposed within said housing at a pressure in the range of 40 to 80 atmospheres, said pressure thereby being sufficiently high as to limit the characteristic absorption length of x-rays therein;

such that x-ray energy entering said housing through said window in the presence of an electric field established between said first and second voltage plates and said collector stripes interacts with said gaseous xenon to produce electrons and postiive ions which propagate between the most proximate one of said first and second voltage plates and the most proximate of said collector stripes.

10. The x-ray detector of claim 9 wherein said window is concavo-convex in cross section, each of said second voltage plates and said collector plates being uniformly spaced from each other and each having a correspondingly concavo-convex cross section, said first voltage plate disposed proximate the inner surface of said window being mounted in electrically insulative relation to said window.

11. The x-ray detector of claim 9 wherein each of said collector stripes is between 30 and 50 mils in width.

12. The x-ray detector claim 9 wherein the x-rays entering said housing have an average energy in the range of 50 to 125 KEV.

13. The x-ray detector of claim 9 wherein each said sheet of electrically conductive material and each of said conductive collector stripes comprises aluminum.

14. The x-ray detector of claim 9 wherein said collector stripes disposed on opposite surfaces of each said nonconductive sheet are respectively arranged in opposed pairs, said pairs of collector stripes on said collector plates being aligned in groups along the trajectory of an x-ray energy beam penetrating said housing window, the pairs in each group being electrically connected together for separate electrical connection to the signal processing circuit.

15. A high resolution computerized tomography x-ray detector, comprising:

a housing;

an x-ray permeable window of concavo-convex cross section disposed in a front wall of said housing;

a plurality of voltage plates, each of said voltage plates comprising a sheet of electrically conductive material, respectively, said voltage plates being mounted within said housing behind said window in parallel, spaced relation;

an x-ray energy transparent window sheet disposed proximate the inner surface of said window in electrically insulative relation thereto;

a plurality of collector plates positioned in interleaved, parallel relation to said voltage plates to achieve an alternating sequence of respectively spaced voltage and collector plates;

said voltage plates and collector plates being mounted such that an x-ray energy beam penetrating said window passes substantially parallel to and between said plates;

said collector plates each comprising a sheet of nonconductive material, respectively, on which is disposed a plurality of substantially parallel conductive collector stripes, said collector stripes being disposed on the opposite surfaces of each of said nonconductive sheets in facing relation with the adjacent ones of said voltage plates;

each of said collector stripes including means for making separate electrical connection to a signal processing circuit, respectively; and gaseous xenon disposed within said housing at a pressure in the range of 40 to 80 atmospheres, said pressure thereby being sufficiently high as to limit the characteristic absorption length of x-rays therein;

such that x-ray energy entering said housing through said window in the presence of an electric field between said voltage plates and said collector stripes interacts with said gaseous xenon to produce electrons and positive ions which propagate between the most proximate ones of said voltage plates and said collector stripes and such that said x-ray in the presence of an electric field established between said window sheet and said collector stripes also interacts with the portion of said gaseous xenon proximate said window to produce additional electrons and positive ions which propagate between said window sheet and the most proximate ones of said collector stripes.

16. The x-ray detector claim 15 wherein each of said collector stripes is between 30 and 50 mils in width.

17. The x-ray detector of claim 15 wherein the x-rays entering said housing hâve an average energy in the range of 50 and 125 KEV.

18. The x-ray detector of claim 15 wherein each said sheet of electrically conductive material comprises aluminum and each of said conductive collector stripes comprises aluminum.

19. The x-ray detector of claim 15 wherein said collector stripes disposed on opposite surfaces of each said nonconductive sheet are respectively arranged in transversely opposed pairs, said pairs of collector stripes on said collector plates being aligned in groups arranged substantially perpendicular to said voltage and collector plates, the pairs of stripes in each group being electrically connected together for separate connection to the signal processing circuit.

20. A high resolution, computerized tomography x-ray detector, comprising:

a housing;

an x-ray permeable window of concavo-convex cross section disposed in a front wall of said housing;

a window sheet disposed proximate the inner surface of said window in electrically insulative relation thereto, said window sheet being substantially transparent to x-ray energy;

a plurality of substantially flat voltage plates mounted within said housing behind said window sheet in parallel, spaced relation to each other;

a plurality of substantially flat collector plates positioned in substantially parallel, alternating relationship with said voltage plates such that an x-ray energy beam penetrating said window passes substantially parallel to and between said voltage and collector plates;

said voltage plates and said collector plates each being comprised of an electrically conductive material which is substantially opaque to x-ray energy;

each of said collector plates, respectively, including means for making separate electrical connection to a signal processing circuit; and gaseous xenon contained within said housing at a pressure in the range of 40 to 80 atmospheres, said pressure thereby being sufficiently high as to limit the characteristics absorption length of x-rays therein;

such that x-ray energy entering said housing through said window in the presence of an electric field between said voltage plates and said collector plates interacts with said gaseous xenon to produce electrons and positive ions which propagate between the most proximate ones of said voltage plates and said collector plates and such that said x-ray energy in the presence of an electric field established between said window sheet and said collector plates also interacts with the portion of said gaseous zenon proximate said window to produce additional electrons and positive ions which propagate between said window sheet and the most proximate ones of said collector plates.

21. The x-ray detector of claim 20 wherein each of said voltage plates and each of said collector plates is comprised of tungsten.

22. The x-ray detector of claim 20 including a support block, said voltage plates and said collector plates being mounted in said support block, said collector plates extending beyond said support block approximately 100 mils into said gaseous xenon along a direction parallel to said x-ray beam.

23. The x-ray detector of claim 20 wherein the x-rays entering said housing have an average energy in the range of 50 to 125 KEV.

* * * * *